(12) United States Patent
Wang et al.

(10) Patent No.: US 9,726,107 B2
(45) Date of Patent: Aug. 8, 2017

(54) FUEL INJECTION CONTROL SYSTEM FOR A SINGLE-CYLINDER DIESEL ENGINE AND CONTROL METHOD THEREFOR

(71) Applicant: Changchai Co., Ltd., Changzhou (CN)

(72) Inventors: Weifeng Wang, Changzhou (CN); Xingao Bian, Changzhou (CN); Zhongquan Shi, Changzhou (CN); Jianzhong Sun, Changzhou (CN); Jing Li, Changzhou (CN); Fei Xiong, Changzhou (CN); Wei Wang, Changzhou (CN)

(73) Assignee: Chagchai Co., Ltd., Changzhou (CN)

( * ) Notice: Subject to any disclaimer, the term of this patent is extended or adjusted under 35 U.S.C. 154(b) by 120 days.

(21) Appl. No.: 14/849,757

(22) Filed: Sep. 10, 2015

(65) Prior Publication Data

US 2016/0076478 A1 Mar. 17, 2016

(30) Foreign Application Priority Data

Sep. 11, 2014 (CN) .......................... 2014 1 0458525

(51) Int. Cl.
*F02D 41/40* (2006.01)
*F02B 75/16* (2006.01)
(Continued)

(52) U.S. Cl.
CPC ............ *F02D 41/401* (2013.01); *F02B 75/16* (2013.01); *F02D 41/0097* (2013.01); *F02D 41/0215* (2013.01); *F02D 41/086* (2013.01); *F02D 41/1479* (2013.01); *F02D 41/28* (2013.01); *F02D 41/3017* (2013.01); *F02D 41/40* (2013.01); *F02D 41/009* (2013.01); *F02D 41/0225* (2013.01); *F02D 2041/285* (2013.01); *F02D 2041/286* (2013.01); *F02D 2041/3052* (2013.01); *F02D 2200/021* (2013.01);
(Continued)

(58) Field of Classification Search
CPC .......... F02D 41/40; F02D 41/00; F02D 41/14; F02D 41/1479; F02D 41/401; F02D 41/0097; F02D 41/3017; F02D 41/3052; F02D 41/2015; F02B 75/16
See application file for complete search history.

(56) References Cited

U.S. PATENT DOCUMENTS

| 4,174,694 A | 11/1979 | Wessel et al. |
|---|---|---|
| 4,541,392 A | 9/1985 | Ogino |

(Continued)

*Primary Examiner* — Hieu T Vo
(74) *Attorney, Agent, or Firm* — Haug Partners LLP; William S. Frommer

(57) ABSTRACT

Disclosed is a fuel injection control system for a single-cylinder diesel engine, comprising: a set of operating condition sensors including an accelerator pedal position sensor and a cooling water temperature sensor, an input signal interface capable of receiving an input signal from the operating condition sensors, a control unit connected to the input signal interface, and a rotational speed sensor provided at a camshaft or starting shaft of the single-cylinder diesel engine. The rational speed sensor is connected to the control unit via a rotational speed correction circuit. The control system can easily and quickly determine the rotational speed and operating stroke of the single-cylinder diesel engine, so as to quickly determine the fuel injection quantity and injection timing of the single-cylinder diesel engine in real time.

9 Claims, 3 Drawing Sheets

(51) Int. Cl.
*F02D 41/00* (2006.01)
*F02D 41/02* (2006.01)
*F02D 41/14* (2006.01)
*F02D 41/30* (2006.01)
*F02D 41/08* (2006.01)
*F02D 41/28* (2006.01)

(52) U.S. Cl.
CPC .. *F02D 2200/101* (2013.01); *F02D 2200/602* (2013.01); *F02D 2200/703* (2013.01); *Y02T 10/44* (2013.01)

(56) References Cited

U.S. PATENT DOCUMENTS

| | | | | |
|---|---|---|---|---|
| 4,730,586 A | * | 3/1988 | Yamaguchi | F02D 41/266 123/357 |
| 5,188,084 A | * | 2/1993 | Sekiguchi | F02D 1/183 123/449 |

* cited by examiner

FUEL INJECTION CONTROL SYSTEM FOR A SINGLE-CYLINDER DIESEL ENGINE AND CONTROL METHOD THEREFOR

TECHNICAL FIELD

The present invention relates to a fuel injection control system for a diesel engine, particularly to a control system for a single-cylinder diesel engine, and a control method for such a control system.

BACKGROUND ART

At present, in a fuel injection control system for a multi-cylinder diesel engine, rotational speed sensors are usually provided both on a crankshaft and a camshaft, so as to detect the rotational speed of the diesel engine and judge the cylinders. In a single-cylinder engine, however, since the space for the camshaft is limited, the rotational speed sensor is only provided on the crankshaft. However, the injection timing cannot be directly determined by the rotational speed of the crankshaft speed alone, but a series of calculations and comparisons of the rotational speed of the crankshaft speed is also required to determine the injection timing of the diesel engine, thereby prolonging the response time and reducing the control accuracy.

SUMMARY OF THE INVENTION

The present invention is intended to provide a fuel injection control system for a single-cylinder diesel engine, which can easily and quickly determine the rotational speed and operating stroke of the single-cylinder diesel engine, so as to quickly determine the fuel injection quantity and injection timing of the single-cylinder diesel engine in real time.

The present invention further provides a fuel injection control system for a single-cylinder diesel engine, which can reduce the disturbance in the received rotational speed signal and can be adapted to a relatively large range of amplitude variation in the rotational speed signals of the diesel engine.

The present invention further provides a fuel injection control method for a single-cylinder diesel engine, which can easily and quickly determine the rotational speed and operating stroke of the single-cylinder diesel engine via a simple method, so as to quickly determine the fuel injection quantity and injection timing of the single-cylinder diesel engine in real time.

The present invention yet further provides a fuel injection control method for a single-cylinder diesel engine, which can reduce the disturbance in the received rotational speed signal and can be adapted to a relatively large range of amplitude variation in the rotational speed signals of the diesel engine.

To this end, the present invention further provides a fuel injection control system for a single-cylinder diesel engine, comprising: a set of operating condition sensors including an accelerator pedal position sensor and a cooling water temperature sensor, an input signal interface capable of receiving an input signal from the operating condition sensors, a control unit connected to the input signal interface, and a rotational speed sensor, wherein the rotational speed sensor, which is provided on a camshaft or starting shaft of the single-cylinder diesel engine, is connected to the control unit via a rotational speed correction circuit.

According to a still further exemplary embodiment of the fuel injection control system for a single-cylinder diesel engine, the rotational speed correction circuit comprises: a filtering and amplitude-limiting circuit connected to the rotational speed sensor, a comparative voltage setting circuit capable of presetting at least one reference voltage, and a comparator connected to the filtering and amplitude-limiting circuit and the comparative voltage setting circuit, the comparator being used to compare an output value of the filtering and amplitude-limiting circuit with the reference voltage of the comparative voltage setting circuit.

According to other further exemplary embodiments of the fuel injection control system for a single-cylinder diesel engine, the comparative voltage setting circuit has a high-speed reference voltage and a low-speed reference voltage; or a feedback resister of a hysteresis comparator is connected in parallel between an input end of the comparator that is connected to the comparative voltage setting circuit and an output end of the comparator; or the operating condition sensors further comprise an atmospheric pressure sensor and a transmission range sensor.

The present invention further provides a control method for the above-mentioned fuel injection control system for a single-cylinder diesel engine, comprising the following steps: receiving a rotational speed signal by the control unit from the camshaft or the staring shaft of the single-cylinder diesel engine via the rotational speed correction circuit, judging the rotational speed of the single-cylinder diesel engine and determining the top dead center thereof according to the rotational speed signal by the control unit, receiving an accelerator pedal position signal of the single-cylinder diesel engine via the input signal interface by the control unit, comparing the accelerator pedal position with a preset idle-speed accelerator pedal position of the single-cylinder diesel engine by the control unit, determining a fuel injection quantity at least according to the accelerator pedal position signal and the rotational speed signal by the control unit if the accelerator pedal position is greater than the idle-speed accelerator pedal position, or determining the fuel injection quantity at least according to an output signal from the cooling water temperature sensor by the control unit if the accelerator pedal position is not greater than the idle-speed accelerator pedal position, and determining a fuel injection timing at least according to the rotational speed, the top dead center and the fuel injection quantity by the control unit.

According to a still further exemplary embodiment of the fuel injection control method for a single-cylinder diesel engine, the rotational speed signal is processed by the filtering and amplitude-limiting circuit in the rotational speed correction circuit to obtain a filtered and amplitude-limited signal, the filtered and amplitude-limited signal is compared with at least one reference voltage to obtain pulse signals, and the control unit judges the rotational speed of the single-cylinder diesel engine and determines the top dead center thereof by using the pulse signals.

According to other further exemplary embodiments of the fuel injection control method for a single-cylinder diesel engine, the reference voltage comprises a high-speed reference voltage and a low-speed reference voltage; or when the accelerator pedal position is not greater than the idle-speed accelerator pedal position, the determination of the fuel injection quantity further takes into consideration the transmission range at which the single-cylinder diesel engine is operated; or when the accelerator pedal position is greater than the idle-speed accelerator pedal position, the determination of the fuel injection quantity further takes into consideration the atmospheric pressure and cooling water temperature at which the single-cylinder diesel engine is operated.

With the fuel injection control system and method for a single-cylinder diesel engine, the rotational speed and operating stroke of the single-cylinder diesel engine can be easily and quickly determined by the rotational speed sensor provided on the camshaft or the starting shaft alone, such that the fuel injection quantity and injection timing of the single-cylinder diesel engine can be so quickly determined in real time.

Furthermore, since the space for the camshaft or starting shaft in the single-cylinder diesel engine is limited, the received rotational speed signal will be disturbed; the control system and method of the present invention can reduce the impact of the disturbing signals on the fuel injection quantity and fuel injection timing, and can be adapted to a relatively large range of amplitude variation in the rotational speed signals of the diesel engine.

BRIEF DESCRIPTION OF THE DRAWINGS

The following accompanying drawings merely illustratively describe and explain the present invention and do not limit the scope of the present invention.

DETAILED DESCRIPTION

Particular Embodiments

Figure 1:
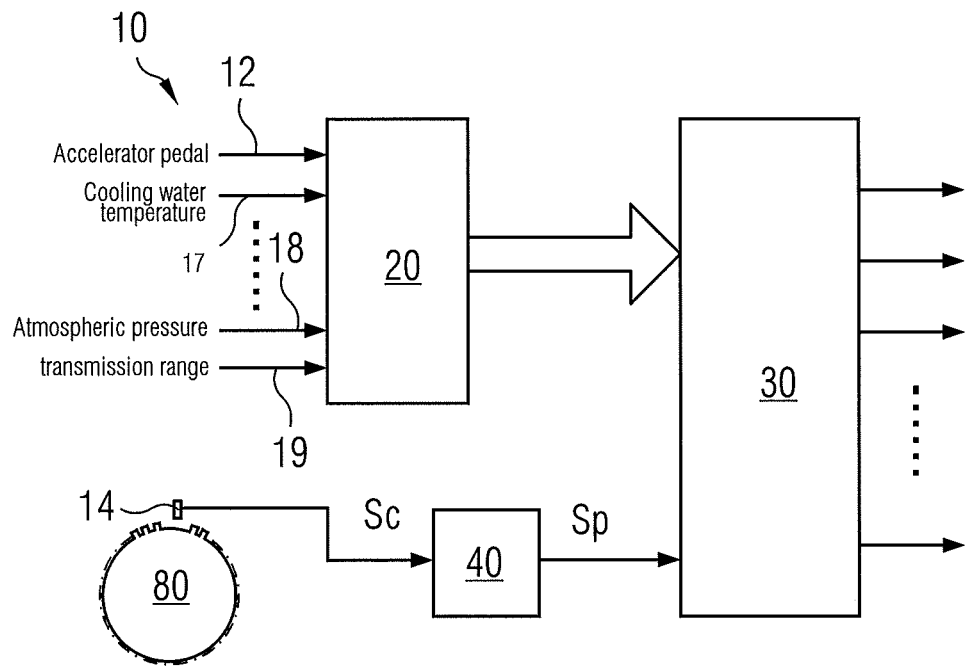
FIG. 1 is an exemplary embodiment of a fuel injection control system for a single-cylinder diesel engine.

For better understanding of the technical features, objects and effects of the present invention, the particular embodiments of the present invention will now be described herein with reference to the accompanying drawings; the accompanying drawings are only used to aid in the understanding of the present invention, and do not represent the actual structure the product in real scales; in the figures, the same reference numeral denotes the same part.

The term "exemplary" herein means "serving as an example, instance, or description", and any "exemplary" illustration and embodiment herein should not be interpreted as a more preferred or a more advantageous technical solution.

As shown in FIG. 1, the fuel injection control system for a single-cylinder diesel engine comprises: a set of operating condition sensors 10, an input signal interface 20, a control unit 30, a rotational speed sensor 14, and a rotational speed correction circuit 40.

The set of operating condition sensors 10 comprises an accelerator pedal position sensor 12 and a cooling water temperature sensor 17, and in other exemplary embodiments of the fuel injection control system for a single-cylinder diesel engine, the operating condition sensors 10 may further comprise sensors commonly used in the control system of the diesel engine, such as an atmospheric pressure sensor 18 and a transmission range sensor 19. The input signal interface 20 may receive an input signal of the operating condition sensors 10, and an output end thereof is connected to the control unit 30.

The fuel injection control system for a single-cylinder diesel engine further comprises a rotational speed sensor 14, and the rotational speed sensor 14 is provided on a camshaft or a starting shaft 80 of the single-cylinder diesel engine. Any type of existing rotational speed sensors can be used in the present invention, and thus it will not be described redundantly. The rotational speed sensor 14 is connected to the control unit 30 via a rotational speed correction circuit 40. A rotational speed signal Sc of the camshaft or the starting shaft 80 outputted by the rotational speed sensor 14 is inputted to the rotational speed correction circuit 40, so as to correct the rotational speed signal Sc and form a set of pulse signals Sp, and this set of pulse signals are inputted to the control unit 30 for determining the fuel injection quantity and fuel injection timing.

Since the rotational speed sensor is provided on the camshaft or the starting shaft 80, the detected rotational speed can directly correspond to the rotational speed or the top dead center position of the diesel engine, so that calculation procedures of the control system can be simplified and real-time control can be achieved. Since the space for the camshaft or starting shaft 80 in the diesel engine is limited, the rotational speed signal Sc outputted by the rotational speed sensor provided may be subjected to external interferences, which have an impact on the control accuracy, such that a correction is required for the rotational speed signal Sc outputted by the camshaft or the starting shaft 80.

Figure 2:
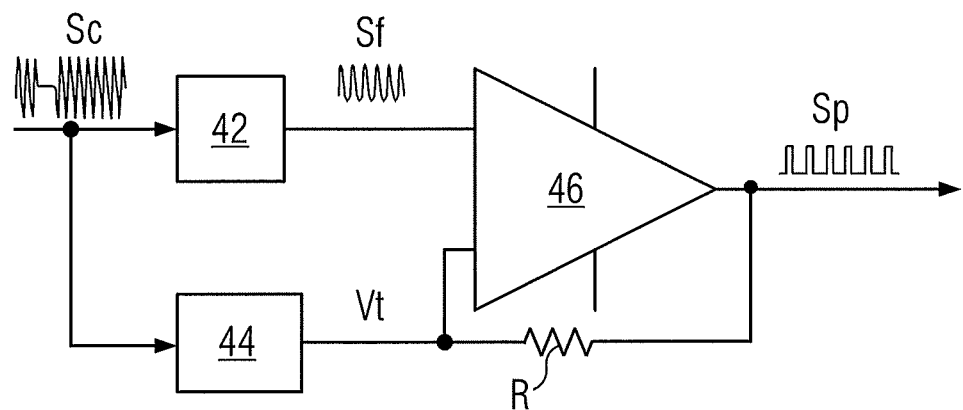
FIG. 2 is used to explain an exemplary embodiment of a rotational speed correction circuit of the fuel injection control system for a single-cylinder diesel engine.

As shown in FIG. 2, in a still further exemplary embodiment of the fuel injection control system for a single-cylinder diesel engine, the rotational speed correction circuit comprises a filtering and amplitude-limiting circuit 42, a comparative voltage setting circuit 44, and a comparator 46. The filtering and amplitude-limiting circuit 42 is connected to the rotational speed sensor 14 mounted on the camshaft, receives the rotational speed signal Sc of the camshaft or the starting shaft outputted by the rotational speed sensor 14, and processes the rotational speed signal Sc through the filtering and amplitude-limiting circuit 42 to obtain the filtered and amplitude-limited signal Sf. The comparative voltage setting circuit 44 may preset at least one reference voltage Vt. The comparator 46 compares the filtered and amplitude-limited signal Sf with the reference voltage Vt and then output a set of pulse signals Sp. The filtering and amplitude-limiting circuit 42, the comparative voltage setting circuit 44, and the comparator 46 may be of any known structure, and therefore the structure and operating principle thereof will not be redundantly described herein.

Since the disturbance signals may be up to 400 mV and the frequency thereof is similar to that of normal signals when the single-cylinder diesel engine is operated at a high speed, setting only one reference voltage may not work well to remove the disturbance signal; therefore, as shown in FIG. 2, in an exemplary embodiment of the fuel injection control system for a single-cylinder diesel engine, the reference voltage Vt of the comparative voltage setting circuit 44 may be selected as a high-speed reference voltage or a low-speed reference voltage according to the rotational speed signal Sc, and the control system selects a different reference voltage according to the rotational speed signal Sc of the camshaft or the starting shaft, so as to be adapted to the situation where the difference between signal variations of the camshaft or the starting shaft is relatively large when the single-cylinder diesel engine rotates at a high and low speed.

As shown in FIG. 2, in an exemplary embodiment of the fuel injection control system for a single-cylinder diesel engine, a feedback resister of a hysteresis comparator R is connected in parallel between an input end of the comparator 46 that is connected to the comparative voltage setting circuit 44 and an output end of the comparator 46, in order to avoid the output oscillation of the comparator caused by a parasitic feedback at the input end of the comparator 46, further ensuring the accuracy of the pulse signals Sp.

As shown in FIG. 1, in an exemplary embodiment of the fuel injection control system for a single-cylinder diesel engine, the operating condition sensors further comprise an atmospheric pressure sensor 18 and a transmission range sensor 19, and these sensors can be used to make the control for fuel injection timing by the control unit 30 more accurate.

Figure 3:
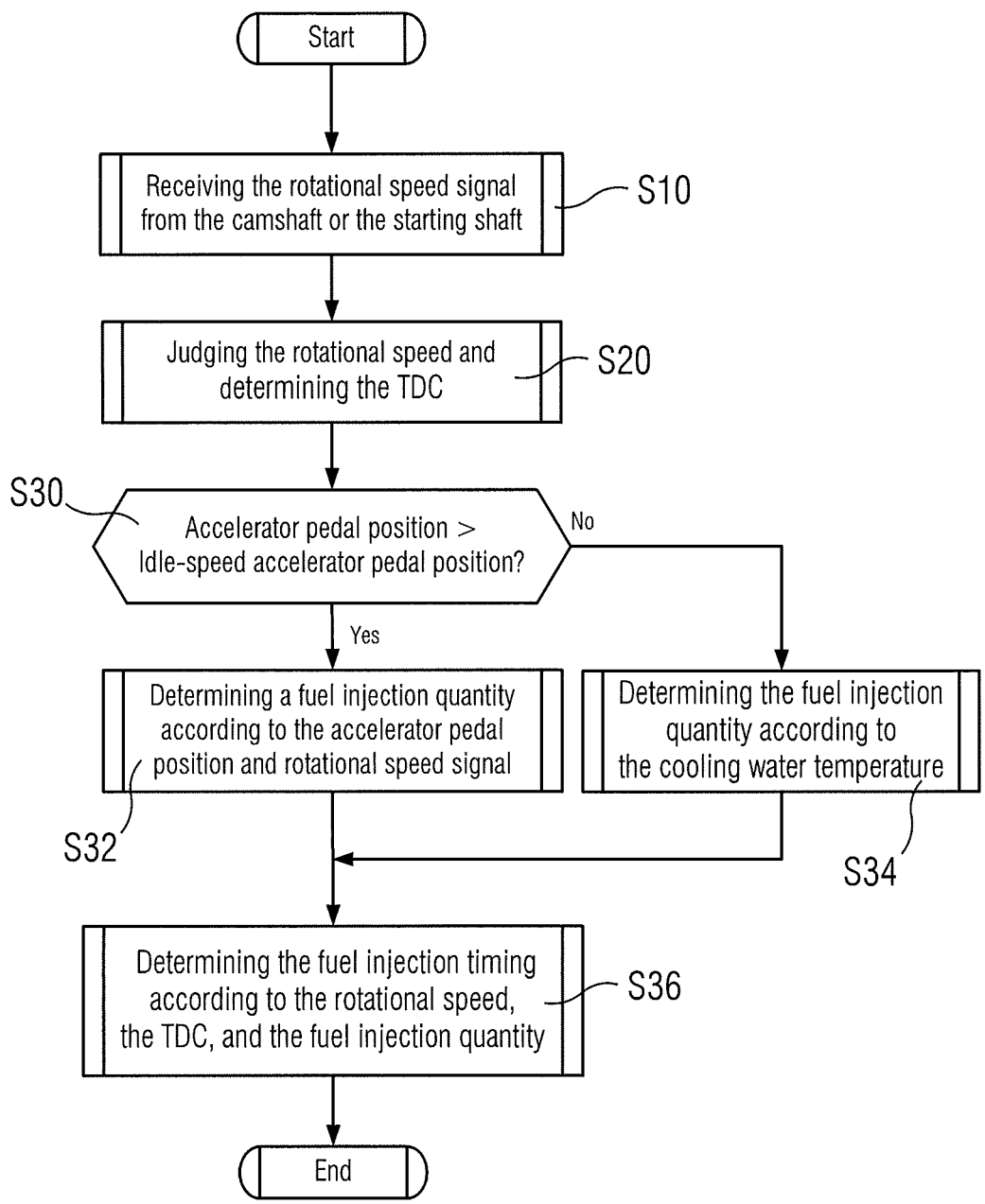
FIG. 3 is an exemplary embodiment of a fuel injection control method for a single-cylinder diesel engine.

FIG. 3 shows a control method for a fuel injection control system for a single-cylinder diesel engine, which will be described below in conjunction with FIGS. 1 and 3.

In step S10, the rotational speed correction circuit 40 receives the rotational speed signal Sc from the camshaft or the starting shaft 80.

In step S20, the control unit 30 judges the rotational speed of the single-cylinder diesel engine and determines the top dead center thereof according to the pulse signals Sp outputted by the rotational speed correction circuit 40. It is possible for the rotational speed sensor mounted on the camshaft or the starting shaft to adopt any known judging method, which will not be redundantly described herein.

In step S30, the control unit 30 compares the accelerator pedal position of the single-cylinder diesel engine received via the input signal interface 20 with a preset idle-speed accelerator pedal position of the single-cylinder diesel engine. If the judgement result in the step S30 is that the accelerator pedal position is greater than the idle-speed accelerator pedal position, then in step S32, the control unit 30 determines a fuel injection quantity according to the accelerator pedal position and rotational speed signal; or if the judgement result in the step S30 is that the accelerator pedal position is not greater than the idle-speed accelerator pedal position, then in step S34, the control unit 30 determines the fuel injection quantity according to a cooling water temperature measured by the cooling water temperature sensor 18. In step S36, the control unit 30 determines the fuel injection timing according to the rotational speed, the top dead center and the fuel injection quantity etc. via any known method.

Figure 4:
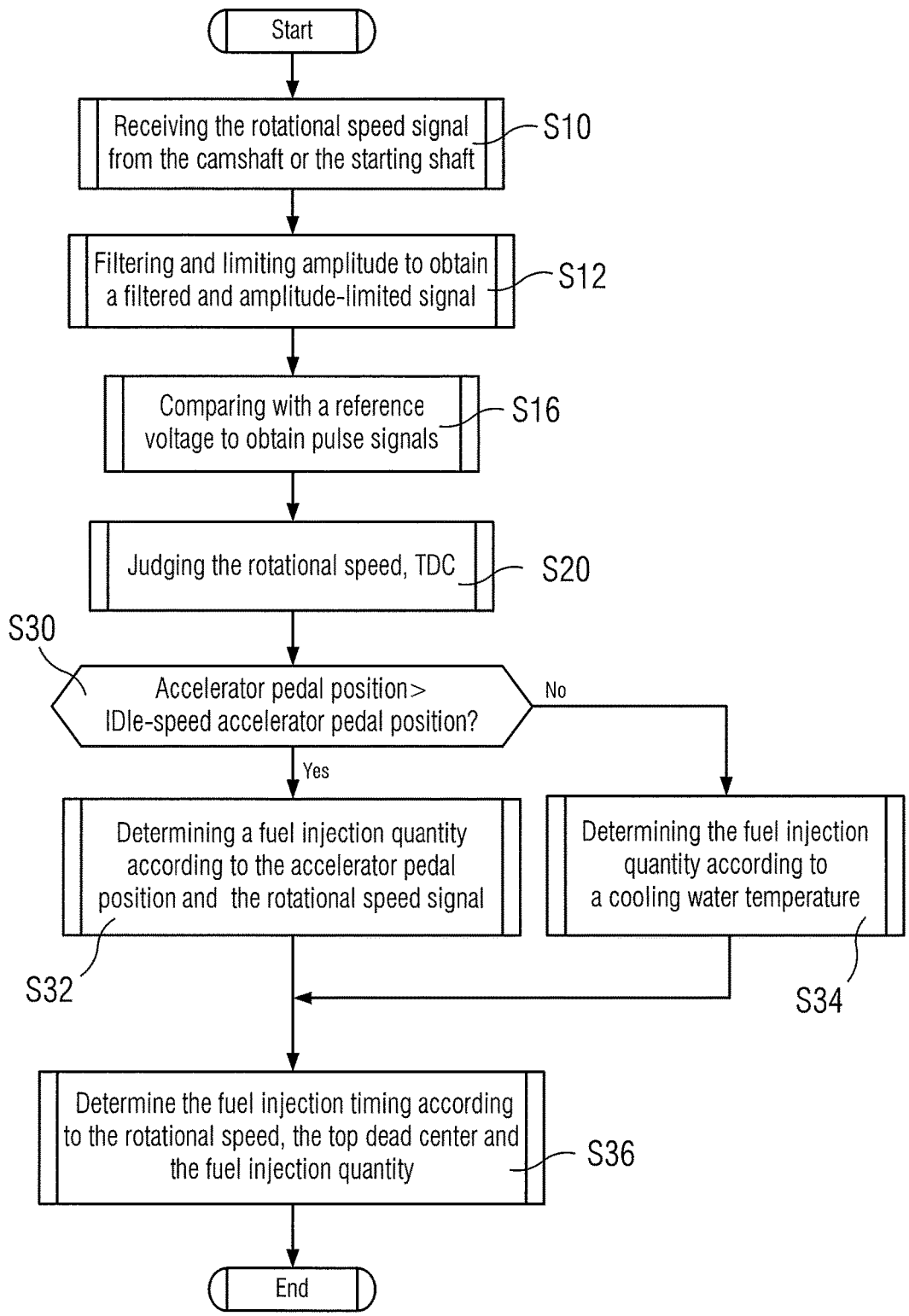
FIG. 4 is another exemplary embodiment of the fuel injection control method for a single-cylinder diesel engine.

Since the space for the camshaft or the starting shaft 80 in the diesel engine is limited, the rotational speed signal Sc outputted by the rotational speed sensor may be subjected to external disturbance, which have an impact on the control accuracy, such that a correction is required for the rotational speed signal Sc outputted by the camshaft or the starting shaft 80; in a still further exemplary embodiment of the fuel injection control method for a single-cylinder diesel engine as shown in FIG. 4, in step S10, the rotational speed correction circuit 40 receives the rotational speed signal Sc from the camshaft or the starting shaft 80 (see FIG. 2), and in step S12, the rotational speed signal Sc is processed by the filtering and amplitude-limiting circuit 42 to obtain a filtered and amplitude-limited signal Sf. In step S16, the filtered and amplitude-limited signal Sf and the reference voltage Vt are inputted to the comparator 46 for comparison, and a set of pulse signals Sp is outputted from the comparator 46. In step S20, the control unit 30 judges the rotational speed of the single-cylinder diesel engine and determines the top dead center thereof according to the pulse signals Sp. The corrected rotational speed signal can better control the fuel injection quantity and fuel injection timing of the single-cylinder diesel engine.

According to other further exemplary embodiments of the fuel injection control method for a single-cylinder diesel engine, the reference voltage Vt comprises a high-speed reference voltage and a low-speed reference voltage, so as to be adapted to a larger range of rotational speed variation of the diesel engine.

In the other further exemplary embodiments of the fuel injection control method for a single-cylinder diesel engine, when the accelerator pedal position is greater than the idle-speed accelerator pedal position, the determination of the fuel injection quantity further takes into consideration the atmospheric pressure and the cooling water temperature at which the single-cylinder diesel engine is operated. Otherwise, when the accelerator pedal position is not greater than the idle-speed accelerator pedal position, the determination of the fuel injection quantity further takes into consideration the transmission range at which the single-cylinder diesel engine is operated.

With the fuel injection control system and method for a single-cylinder diesel engine, the rotational speed and operating stroke of the single-cylinder diesel engine can be easily and quickly determined only by the rotational speed sensor provided on the camshaft or the starting shaft alone, such that the fuel injection quantity and injection timing of the single-cylinder diesel engine can be so quickly determined in real time.

It should be understood that, although the description is given according to each of the embodiments, but each embodiment does not only comprise an independent technical solution, this narrative manner of the description is only for clarity, and for a person skilled in the art, the description shall be regarded as a whole, and the technical solution in each of the embodiments can also be properly combined to form other implementations that can be understood by a person skilled in the art.

The detailed descriptions set forth above are merely specific descriptions directed to the feasible embodiments of the present invention, and they are not intended to limit the scope of protection of the present invention; any equivalent embodiment or alteration of the present invention, such as the combination of features, the division or the duplication of a feature, made without departing from the technical spirit of the present invention, shall be included within the scope of protection of the present invention.

The invention claimed is:

1. A fuel injection control system for a single-cylinder diesel engine, comprising:
   a set of operating condition sensors including
      an accelerator pedal position sensor, and
      a cooling water temperature sensor;
   an input signal interface capable of receiving an input signal from the operating condition sensors; and
   a control unit connected to the input signal interface;
   characterized in that said control system further comprises
      a rotational speed sensor provided on the camshaft or the starting shaft of the single-cylinder diesel engine, and connected to the control unit via a rotational speed correction circuit,
   said rotational speed correction circuit comprising:
   a filtering and amplitude-limiting circuit connected to the rotational speed sensor,
   a comparative voltage setting circuit capable of presetting at least one reference voltage, and a comparator connected to the filtering and amplitude-limiting circuit and the comparative voltage setting circuit, which comparator is used to compare an output value of the filtering and amplitude-limiting circuit with the reference voltage of the comparative voltage setting circuit.

2. The control system as claimed in claim 1, wherein the reference voltage comprises a high-speed reference voltage and a low-speed reference voltage.

3. The control system as claimed in claim 1, wherein a feedback resister of a hysteresis comparator is connected in parallel between an input end of said comparator that is connected to said comparative voltage setting circuit and an output end of the comparator.

4. The control system as claimed in claim 1, wherein the operating condition sensors further comprise an atmospheric pressure sensor and a transmission range sensor.

5. A control method for a fuel injection control system for a single-cylinder diesel engine comprising a set of operating condition sensors including an accelerator pedal position sensor, and a cooling water temperature sensor, an input signal interface capable of receiving an input signal from the operating condition sensors; and a control unit connected to the input signal interface, the control system comprising a rotational speed sensor provided on the camshaft or the starting shaft of the single-cylinder diesel engine, and connected to the control unit via a rotational speed correction circuit, the method comprising:
  receiving a rotational speed signal by the control unit from the camshaft or the starting shaft of the single-cylinder diesel engine via said rotational speed correction circuit;
  judging the rotational speed of said single-cylinder diesel engine and determining the top dead center thereof according to said rotational speed signal by the control unit;
  receiving an accelerator pedal position signal of the single-cylinder diesel engine via the input signal interface by the control unit;
  comparing the accelerator pedal position with a preset idle-speed accelerator pedal position of the single-cylinder diesel engine by said control unit;
  determining a fuel injection quantity at least according to the accelerator pedal position signal and the rotational speed signal by said control unit if the accelerator pedal position is greater than the idle-speed accelerator pedal position, or determining the fuel injection quantity at least according to an output signal from the cooling water temperature sensor by the control unit if the accelerator pedal position is not greater than the idle-speed accelerator pedal position; and
  determining a fuel injection timing at least according to the rotational speed, the top dead center and the fuel injection quantity by the control unit.

6. The control method as claimed in claim 5, wherein the rotational speed signal is processed to obtain a filtered and amplitude-limited signal, comparing the filtered and amplitude-limited signal with at least one reference voltage to obtain pulse signals, and judging the rotational speed of the single-cylinder diesel engine and determining the top dead center thereof by using the pulse signals.

7. The control method as claimed in claim 6, wherein the reference voltage comprises a high-speed reference voltage and a low-speed reference voltage.

8. The control method as claimed in claim 5, wherein, when the accelerator pedal position is not greater than the idle-speed accelerator pedal position, the determination of the fuel injection quantity further takes into consideration the transmission range at which the single-cylinder diesel engine is operated.

9. The control method as claimed in claim 5, wherein, when the accelerator pedal position is greater than the idle-speed accelerator pedal position, the determination of the fuel injection quantity further takes into consideration the atmospheric pressure and cooling water temperature at which the single-cylinder diesel engine is operated.

* * * * *